May 13, 1924.

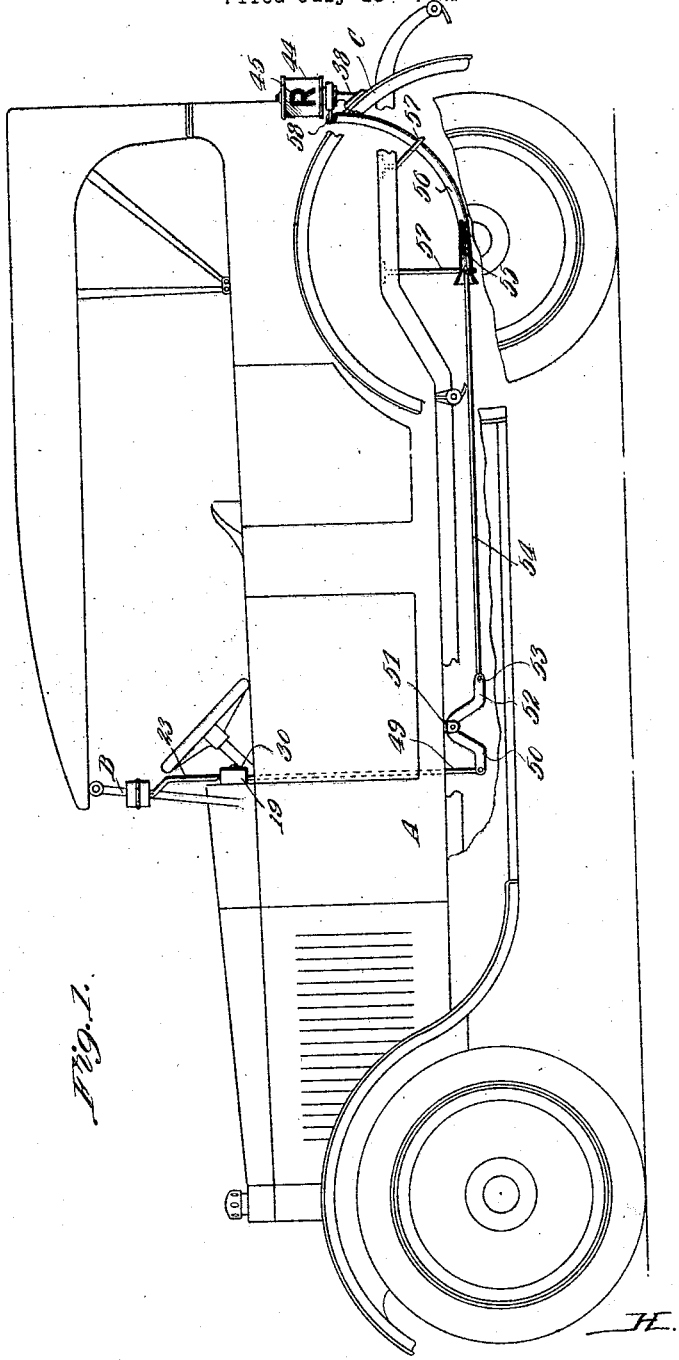

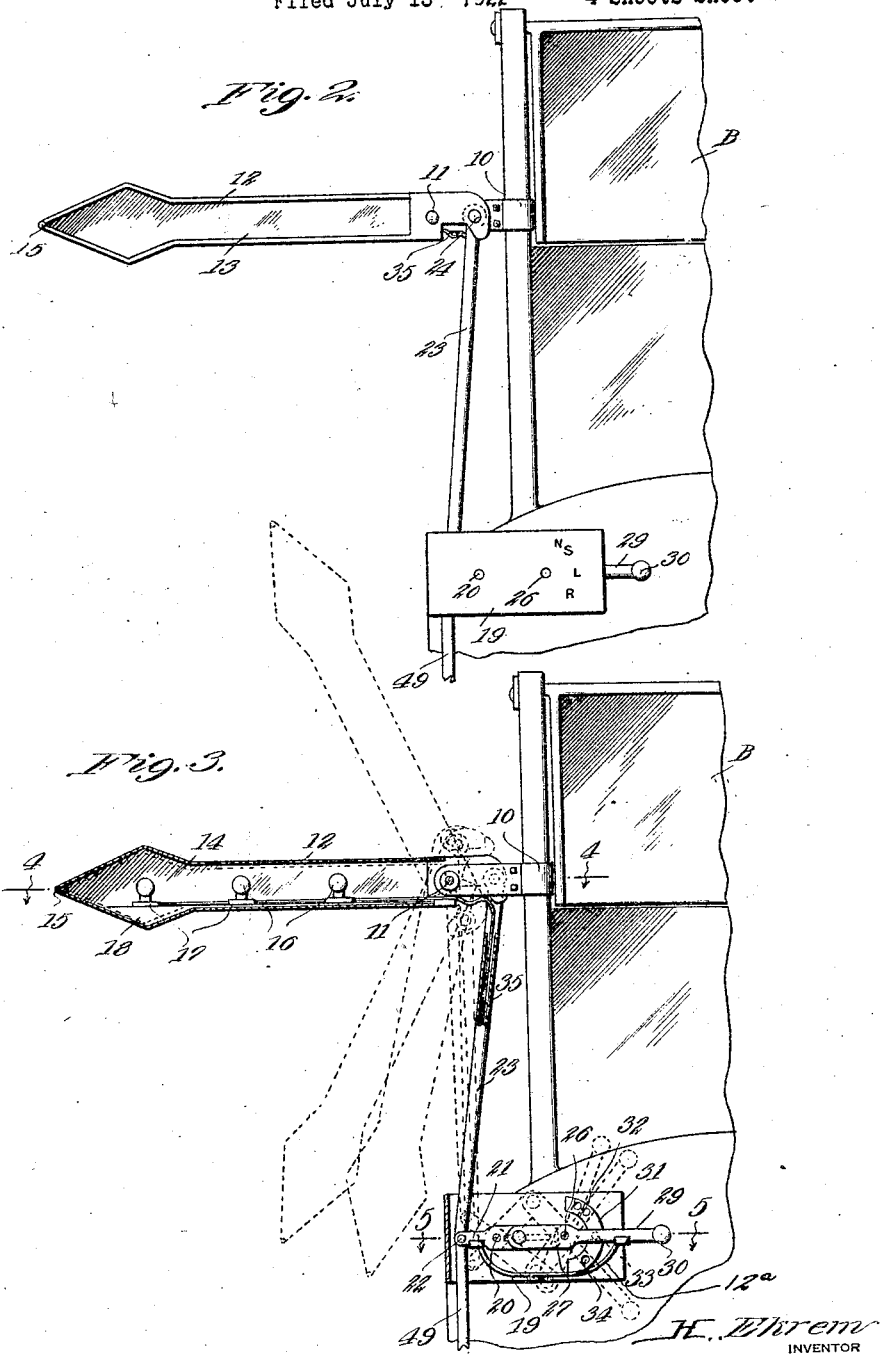

H. EKREM

DIRECTION SIGNAL

Filed July 13, 1922    4 Sheets-Sheet 3

H. Ekrem
INVENTOR

BY Victor J. Evans
ATTORNEY

May 13, 1924.

H. EKREM

DIRECTION SIGNAL

Filed July 13, 1922  4 Sheets-Sheet 4

1,494,226

H. Ekrem
INVENTOR

BY Victor J. Evans
ATTORNEY

WITNESS:

Patented May 13, 1924.

1,494,226

UNITED STATES PATENT OFFICE.

HARRY EKREM, OF SAN PEDRO, CALIFORNIA.

DIRECTION SIGNAL.

Application filed July 13, 1922. Serial No. 574,751.

*To all whom it may concern:*

Be it known that I, HARRY EKREM, a citizen of the United States, residing at San Pedro, in the county of Los Angeles and State of California, have invented new and useful Improvements in Direction Signals, of which the following is a specification.

This invention relates to signals and has for its object the provision of a novel signal device designed to be mounted at the front and rear of an automobile, such as for instance upon the windshield and the rear fender, and operable by the driver whereby to apprise the operators of other vehicles, pedestrians, traffic officers and all others who might be interested of a contemplated turn in either direction or an intended stop, the device thus operating to lessen the danger of collision and serving to prevent traffic congestion.

An important object is the provision of a signal device of this character in which both signal members are operated by movement of a single control element.

Another object is the provision of a device of this character in which the signal elements themselves are provided with electric illuminating means whereby the device is as capable for use by night as by day.

An additional object is the provision of a device of this character which will be simple and inexpensive in manufacture, easy to install and control, efficient and durable in use and a general improvement in the art.

Figure 4:
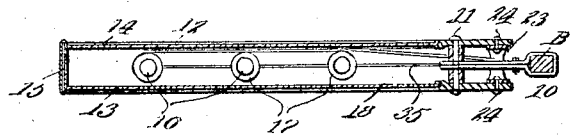
Figure 5:
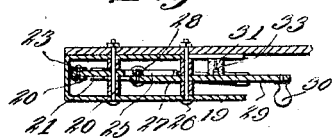
Figure 6:
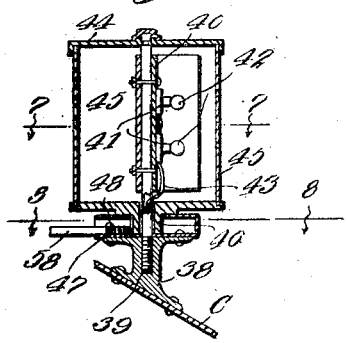
Figure 7:
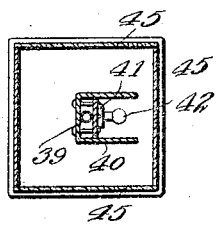
Figure 8:
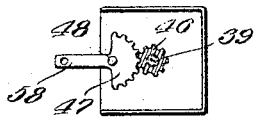
Figure 9:
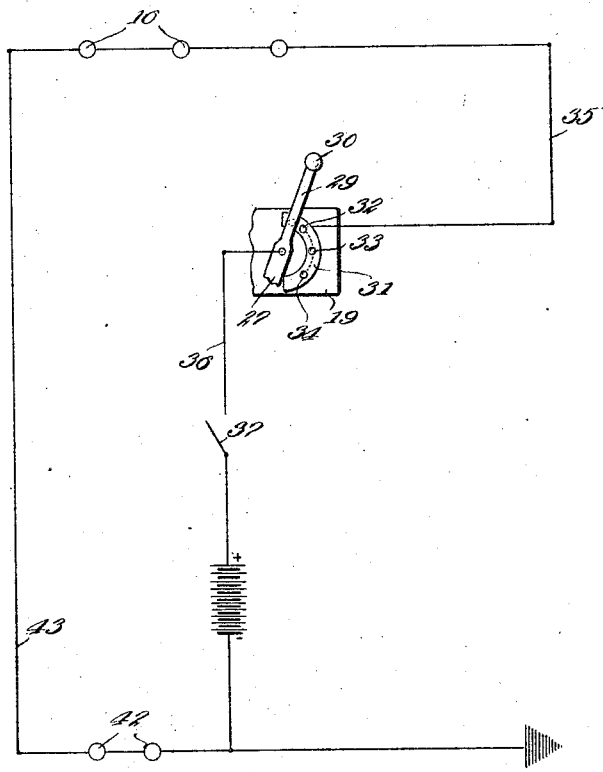
Figure 10:
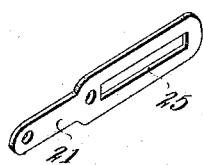
Figure 11:
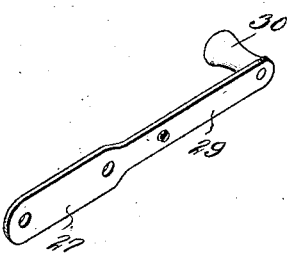

With the above and other objects and advantages in view the invention consists in the details of construction to be hereinafter more fully described and claimed and illustrated in the accompanying drawings, in which:

Figure 1 is a side elevation of an automobile equipped with my device, parts being broken away and in section, Figure 2 is a cross sectional view through the body looking toward the windshield and showing one position of the signal arm thereon, Figure 3 is a similar view but showing the signal arm in section and also showing the housing for the control levers in section and illustrating a different position of the signal arm, Figure 4 is a horizontal section on the line 4—4 of Figure 3, Figure 5 is a detail section on the line 5—5 of Figure 3, Figure 6 is a vertical section through the signal device mounted on the rear fender, Figure 7 is a horizontal section therethrough on the line 7—7 of Figure 6, Figure 8 is a horizontal section on the line 8—8 of Figure 6, Figure 9 is a diagram of the electric circuit, The remaining figures are detail views.

Referring more particularly to the drawings the letter A designates a portion of the body of an automobile, B designates a windshield and C designates one of the rear fenders.

In carrying out my invention I provide a bracket 10 detachably clamped upon the left side bar of the windshield frame, this bracket being of any suitable construction and dimensions depending upon the nature of the windshield. Pivotally mounted at 11 upon this bracket is a signal arm 12 which is formed as a hollow shell of metal having a portion of its front and back walls open and covered with red and green glass panes 13 and 14 respectively. A portion of one wall of this arm is hinged as indicated at 15 whereby access may be had to the interior for the purpose of renewing incandescent bulbs 16 which are held within sockets 17 suitably mounted upon an insulating body 18 within the arm.

Mounted at the lower portion of the windshield and suitably supported therefrom or from one side of the body is a casing 19 within which is pivoted at 20 a lever 21 which has one end pivotally connected at 22 with the lower end of a rod 23 which may be formed as a hollow pipe and which has its upper end pivotally connected at 24 with the arm 12 at a point spaced from the pivot 11 thereof. The lever 21 is formed at its free end with an elongated slot 25. Pivoted at 26 within the casing 19 is a lever 27 which has one end carrying a roller 28 passing through the slot 25. The other end of this lever 27 is formed with an extension 29 carrying a knob 30 which is located exteriorly of the casing 19.

Located within the casing 19 is a body 31 of insulating material upon which are contacts 32, 33 and 34 engageable by the lever 27. These contacts 32, 33 and 34 are all connected with the sockets 17 by wires 35 and connected with the lever 27 is a wire 36 leading from the battery of the car. The other terminals of the sockets 17 are grounded. A suitable control switch 37 is interposed somewhere in the wiring for the purpose of cutting off the current when the device is used in the day time.

To counterbalance the weight of the arm 12 and associated parts, I provide a spring 12ª which is suitably secured within the casing 19 and which is of U-shape with the end of one arm engaging the link 21 between the pivots 20 and 22 and with the end of its other arm engaging the member 29 between the pivot 26 and knob 30. When the arm 12 is in neutral position it requires no counterbalance, but when it assumes the position indicating a turn to the left or right, as will be described, a counterbalance is necessary. This spring operates efficiently to perform the necessary action.

Mounted upon the rear fender C or other desired location at the rear end of the vehicle is a stationary bracket 38 to which is secured a shaft 39 which extends upwardly and which carries a stationary support 40 upon which are mounted lamp sockets 41 within which are engaged incandescent bulbs 42 which each have one terminal grounded and which have their other terminals connected by a wire 43 with the wire 35.

Surrounding the support 40 and the bulbs thereon is a casing 44 which is here shown as rectangular in shape and provided in three sides with glass panels 45, which carry the legends "L", "R", and "S" representing "left", "right" and "stop". These panels are preferably of white glass or opaque material, either one, with the letters thereon in red transparent material. This casing 40 is freely rotatable and has its lower end carrying a pinion 46 with which meshes a segmental gear 47 pivoted at 48 upon the bracket 38.

Pivotally connected with either of the pivots 28 or 22 is a downwardly extending link 49 which has its lower end pivotally connected with one arm of an angle lever 50 pivoted on a bracket 51 on the underside of the body of the car. Pivotally connected with the other arm 52 of this angle lever as shown at 53 is a link 54 which extends rearwardly and which carries a flexible member 55 which is trained through a curved guide tube 56 secured at the lower part of the body as by means of clamps 57. This flexible member is connected with an extension arm 58 on the segmental gear 47.

The operation is as follows: Assuming that the device has been constructed and assembled as above described, whenever the operator desires to signal an intention to turn or to stop he grasps the knob 30 and pulls either up or down as the case may be which will result in swinging of the lever 27 upon its pivot 26 and consequent corresponding swinging of the lever 21 upon its pivot 20. This will result in movement of the rod 23 which will swing the arm 12 into any one of the three positions indicated to give the desired signal. When the arm 12 is swung up it indicates a turn to the right, when it is swung straight out it indicates a turn to the left and swung downwardly indicates an intention to stop. The furthermost downwardly swung position is the normal or inoperative position. These various positions are indicated by the dotted lines in one of the figures.

At the same time the movement of the arm 12 occurs it will be apparent that the engagement of the lever 27 with either of the contacts 32, 33 or 34 will result in energization of the bulbs 16 in the arm 12 in case the switch 37 is closed. This renders the device suitable for use at night. Whenever the signal arm 12 is operated by moving the lever 27 it will be apparent that the link 49 will be moved also, either up or down as the case may be and this will result in swinging the angle lever 50. When the angle lever is swung longitudinal movement will be imparted to the link 54 and this will result in pushing or pulling upon the flexible element 55 which must naturally be a rather stiff spring wire or the like. When this movement occurs it is apparent that the segmental gear 47 will be swung whereupon its engagement with the pinion 46 will cause rotation of the casing 44 which has the panels bearing the legends. The movement of the casing 44 corresponds exactly to the movement of the signal arm 12 so that the legend brought before the bulbs 42 will correspond with the indicating position of the signal arm 12.

The rod 23 and link 54 are formed as pipe sections so as to serve as housings for the current carrying wires which feed the electric lamps. Owing to the fact that the sockets 41 in the rear signal member are connected with the contact points 32, 33 and 34 it will be apparent that these bulbs will be energized simultaneously with the bulbs in the signal arm.

From the foregoing description and a study of the drawings it will be apparent that I have thus provided a simply constructed and yet highly efficient signal device for vehicles which will be of distinct advantage in apprising all those interested of any contemplated turn or stop so that danger of collision will be avoided and traffic congestion prevented. As there is so little to get out of order it is apparent that the device should be practically "fool proof" and that the device should have a long life.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. Actuating means for a signal comprising a casing adapted to be mounted upon a vehicle, a member pivoted intermediate its ends within said casing, a rod pivotally connected with one end of said member and adapted for connection with the signal to be actuated, a lever pivoted intermediate its ends within said casing and having a slot and pin connection with said member, and a bow spring secured within the casing and having its ends engaging against the undersides of said member and said lever.

2. Actuating means for a signal comprising a casing adapted to be mounted upon a vehicle, a member pivoted intermediate its ends within said casing, a rod pivotally connected with one end of said member and adapted for connection with the signal to be actuated, a lever pivoted intermediate its ends within said casing and having a slot and pin connection with said member, and a bow spring secured within the casing and having its ends engaging against the undersides of said member and said lever, outwardly of the pivotal mountings thereof.

3. Means for actuating a signal comprising a supporting member adapted to be mounted upon a vehicle, a rod extending into said support and adapted for connection with the signal to be actuated, a lever pivoted intermediate its ends within said casing and pivotally connected with said rod, said lever being formed with a longitudinal slot, a second lever pivoted intermediate its ends within the support and carrying a pivot element engaging within said slot, said second named lever projecting beyond the inner end of the support to serve as a handle and a double ended bow spring within the support having its ends engaging against the undersides of both of said levers.

In testimony whereof I affix my signature.

HARRY EKREM.